No. 792,629.

Patented June 20, 1905.

UNITED STATES PATENT OFFICE.

WILLIAM SUNDERLAND, OF LEHI, UTAH.

PROCESS OF TREATING THE PLANT BALSAM ORRIZA.

SPECIFICATION forming part of Letters Patent No. 792,629, dated June 20, 1905.

Application filed May 23, 1904. Serial No. 209,426.

*To all whom it may concern:*

Be it known that I, WILLIAM SUNDERLAND, a citizen of the United States, residing at Lehi, in the county of Utah and State of Utah, have invented new and useful improvements in processes of treating the wild gummy fiber root or plant *Balsam Orriza*, locally known as "white dock" or "Indian root," for its fibrous contents, rubber-like gum, and resinous compound or composition of matter, of which the following is a specification.

This invention relates to the process of extracting from the root or plant *Balsam Orriza* the fibrous substance, rubber-like gum, and resinous compositions of matter and other bodies by steam heat and alkali solutions, and has for its object to render the process more expeditious and considerably cheaper than that by the use of hydrocarbons as solvents.

First. In practicing my invention or discovery I first take a sufficient quantity of the root or plant *Balsam Orriza*, preferably only the root and crown of the plant, these portions containing the fiber and gummy matter.

Second. After removing the leaves and flower-stems the said roots are thoroughly washed in water. Then the roots are passed through toothed rollers having sufficient spring-pressure to move the bark or skin, but at the same time not sufficient pressure to break or damage the fiber contents of the root.

Third. The clean white roots are then placed in tank or vessel containing a boiling alkali solution and a perforated cover pressed upon the roots and made secure, leaving about two or three inches of the boiling solution above the said cover. All soluble matter is then absorbed into the alkali solution. The rubber-gum, being insoluble in the alkali solution, rises to the surface of the said solution through the perforated cover and is skimmed or floated off. The said gum is then washed and rolled in pure cold water to free the same from all extraneous matter, the resulting gum being of a light-brown color, perfectly pure, highly flexible, and combustible, insoluble in water, but soluble in the known solvents of hydrocarbons, such as carbon disulfid, gasolene, benzin, &c.

Fourth. The roots are then removed from tanks or vessels and placed in tanks containing a weak alkali solution and a floating cover placed upon the same to keep them under the solution and subject them to a fermentation process ten days or two weeks, the said solution becoming dark brown and after a time covered with a substance similar to brewers' yeast, but of an offensive odor. After this fermentation collects the roots are removed and washed in water and passed through an ordinary carding-machine, the resulting fiber or textile substance being the product and result of the above-described treatment.

Fifth. The alkali solution from the boiling-tank and fermentation-tank are then evaporated to dryness, the resulting product being a black resinous tar-like composition of matter suitable for varnishes or paint and various purposes of manufacture.

What I claim as my invention, and desire to secure by Letters Patent, is—

The process of obtaining fiber, rubber-gum, resins and other bodies from the plant *Balsam Orriza* consisting in: first, removing the bark; second, boiling in an alkali solution and removing the floating gum; third, fermenting in water rendered alkaline and lastly carding the resulting fiber and evaporating the alkali solutions to dryness, substantially as described.

WILLIAM SUNDERLAND.

Witnesses:
　GEORGE BECK,
　MERRIHEW,
　E. J. WADSWORTH,
　JAMES H. TUCKFIELD,
　S. W. ROSS.